May 27, 1958     J. C. BARR ET AL     2,836,347
DIFFUSER

Filed July 28, 1952            2 Sheets-Sheet 1

Inventors
John C. Barr
James Hodge
By Stevens, Davis, Miller & Mosher
his Attorneys United States Patent Office 2,836,347
Patented May 27, 1958

2,836,347

DIFFUSER

John C. Barr, Ascot, and James Hodge, Farnborough, England, assignors to Power Jets (Research & Development) Limited, London, England, a British company Application July 28, 1952, Serial No. 301,342

Claims priority, application Great Britain August 2, 1951

4 Claims. (Cl. 23—127)

This invention relates to a diffuser forming an outlet passage from a centrifugal compressor designed for elastic-fluid flow.

With such centrifugal compressors it is common to employ a vaneless diffusing system into which the fluid flow passes on leaving the tip of the impeller. Such a diffusing system makes use of the fluid flow following a free vortex or constant angular momentum pattern. Changes occur in two velocity components, namely, in the whirl component and in the component along the median of the fluid passage. As the flow progresses down-stream the distance from the impeller axis increases and, by the principle of constant angular momentum, the whirl velocity ($V_w$) decreases. In a common example of a diffusing system a parallel walled clearance space is provided radially beyond the impeller tip; in this case the median velocity ($V_m$) is synonymous with the radial velocity and it decreases as the flow progresses because of the increasing area assigned to the flow and the increasing density of the fluid. Thus the resultant velocity of the fluid flow is reduced and the velocity energy is translated into pressure energy.

In the construction of gas turbine plant, to which the present invention is particularly applicable, the maximum possible efficiency of each component part is always sought. Up till the present, it has been generally accepted that parallel-walled diffusing passages should be employed, at least for the section of a diffuser through which the flow first passes. A divergent downstream section may follow. It is now proposed that, by using vaneless diffusers with certain equivalent cone angles less than those hitherto employed, an increase in efficiency can be effected.

The equivalent cone angle of a fluid passage may be considered, over a small element of the length of the passage, as the angle subtended by straight lines joining the extremities of parallel diameters of two coaxial circles, of areas respectively equal to the entry and exit cross sectional areas of the element of the passage and separate by a distance equal to the length of the element. With a parallel walled clearance space of radial length 1½ inches and width 2 inches at the exit from a centrifugal impeller of diameter 20 inches, the average equivalent cone angle is approximately 33° over the whole radial length of the passage, taken in the direction of the median velocity flow.

The present invention provides a diffuser at the exit from an elastic-fluid flow centrifugal compressor in which the diffuser walls define an equivalent cone angle over any small element of the length of the passage of not greater divergence than 12° in the median direction of flow whereby the whirl velocity of the fluid at entry to the diffuser is substantially reduced during flow through the diffuser whilst the median velocity undergoes no alteration of comparable order.

The walls of the diffuser may follow a smooth curve from its entry to its exit. Throughout the length of the curved diffuser the equivalent cone angle may be maintained substantially constant. On the other hand the diffuser may have an equivalent cone angle which is a predetermined average throughout the whole length of the diffuser so that its walls are frustoconical surfaces.

The invention will now be described by way of example only with reference to certain embodiments thereof shown in the accompanying drawings in which.

Figure 2:
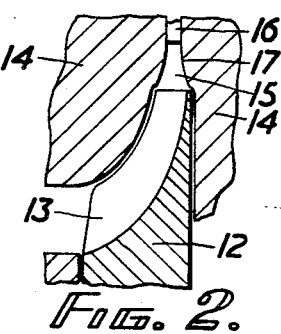
Figure 2 shows one embodiment of the invention in which the diffuser walls follow a smooth curve.
Figure 3:
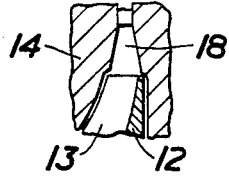

Figure 3 indicates a modification of Figure 2 in that the walls of the diffuser are frusto-conical surfaces.

Figure 4:
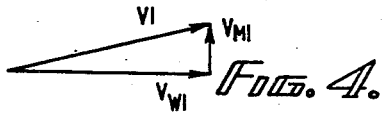
Figures 5, 6:
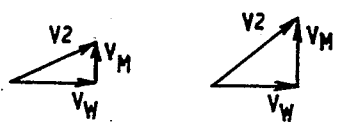

Figures 4, 5 and 6 show velocity triangles at entry and exit from conventional diffusers and those according to the invention.

Figure 7:
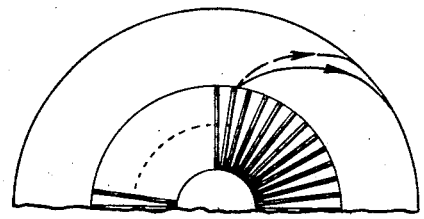

Figure 7 is a diagrammatic front view of a centrifugal impeller and diffuser space indicating the flow path in conventional diffusers and in those according to the invention.

Figure 8:
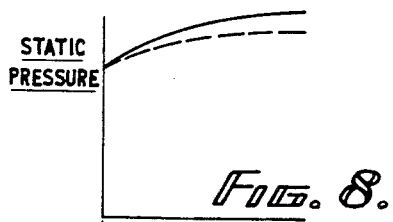
Figure 9:
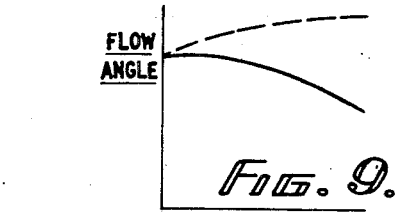

Figures 8 and 9 are graphs showing comparisons between different kinds of diffuser.

Figure 10:
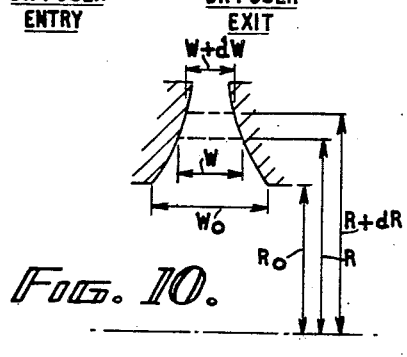
Figure 11:
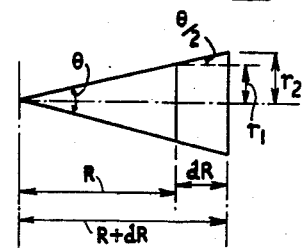

Figures 10 and 11 are diagrams showing characteristic measurements which will be used in explaining the design of diffusers according to this invention.

Figure 1:
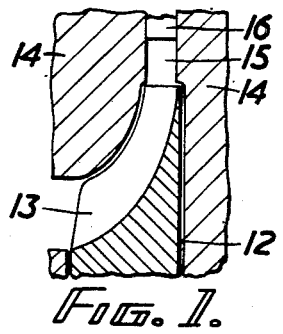
Figure 1 shows a section through part of a conventional centrifugal impeller together with its vaneless parallel walled diffuser beyond the impeller tip.
Figure 12:
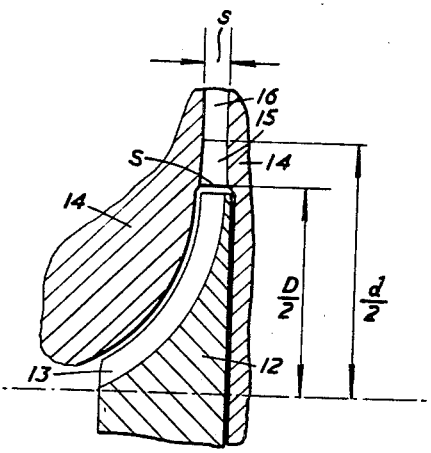

Figure 12 is a section similar to Figures 1 to 3 illustrating the dimensions of the diffuser and the radial distances to the inlet and outlet portions of the diffuser from the center line of the impeller blade.

Figure 13:
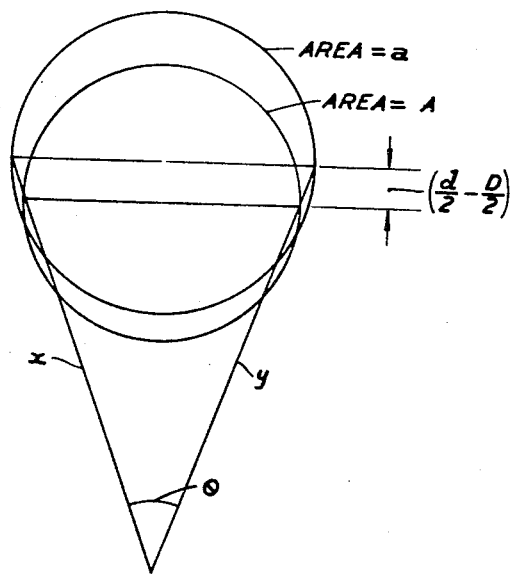

Figure 13 is a diagrammatic view similar to Figure 11 showing the method of ascertaining the equivalent cone angle.

In Figure 1 there will be seen a centrifugal impeller 12 having blades 13, surrounding stationary structure being indicated at 14. Fluid flow through the impeller is initially axial and finally in a generally radial direction. Fluid leaving the impeller tip passes into a vaneless parallel walled diffuser 15 beyond which there may be vanes 16. As has been stated above the average equivalent cone angle for such a diffuser may be about 33° and with such a cone angle breakaway of the fluid flow close to the walls is experienced and this leads to loss of efficiency. It is also a potential source of instability of operation of the compressor. An equivalent cone angle of 12° or less prevents any appreciable breakaway taking place. The breakaway loss is serious, and its reduction or substantial elimination would considerably increase the overall efficiency of a diffuser. Another serious loss is through friction which is increased by the fluid leaving the impeller tip with a whirl component of velocity so that it follows a helical path thus giving rise to considerable friction between the fluid flow and the walls. It will be made clear below how diffusers according to the invention substantially reduce both friction and breakaway losses.

In Figure 2 the same impeller is shown discharging into a diffuser which is an embodiment of the invention. Thus it has an equivalent cone angle of no greater divergence than 12° over any small element of the length of the passage. Moreover, in this instance the equivalent cone angle is maintained substantially constant throughout the length of the diffuser and the walls follow a smooth curve as is clearly indicated at 17. The diffuser whilst having less divergence than 12° may have a predetermined average equivalent cone angle over its whole length in which case the walls are frusto-conical surfaces. This arrangement is shown at 18 in Figure 3.

Figure 4 shows the velocity triangle of the flow at exit from a centrifugal impeller and naturally this is identical whatever diffuser immediately follows. $V_{w1}$ is the whirl velocity component. $V_{m1}$ is the velocity in the median direction of flow. $V_1$ is the relative velocity.

Figure 5 shows the velocity triangle at exit from the vaneless diffuser space in the conventional case with parallel walls. Whirl velocity $V_w$ has been substantially reduced, say to a third of its value at entry to the diffuser, and the median velocity $V_m$ is slightly reduced and the resultant velocity $V_2$ is reduced in the same general sense as the whirl velocity.

Figure 6 shows that with the newly proposed diffuser the whirl component is reduced in the same way. The component of velocity in the median direction is perhaps slightly increased but the resultant velocity $V_2$ is still comparable with that obtained with a conventional diffuser.

In Figure 7 a diagrammatic front view of an impeller is seen and the full line represents the flow path for the fluid from the time when it leaves the impeller tip until the time when it leaves a conventional diffuser. The dotted line shows that the flow path for a diffuser according to the invention is shorter. Hence less friction can be caused between the fluid and the walls in this case.

With the somewhat increase velocity maintained through the diffuser according to the invention compared with parallel walled diffusers it is clear that the static pressure increases less than formerly. This is indicated in Figure 8 where the full line represents the increase of static pressure during flow through a conventional diffuser and the dotted line shows the flow through an embodiment of the invention.

Figure 9 shows the variation of the flow angle (from the direction tangential to the impeller periphery) with the increase in radius through the diffuser. The dotted and full lines have the same significance as in Figures 7 and 8.

In order to maintain a substantial constant equivalent cone angle throughout the length of the diffuser it is necessary to consider the variation in cross sectional areas at entry to and exit from small elements taken in the length of the diffuser. A design of diffuser giving such constant equivalent cone angle throughout produces a diffuser with curved wall surfaces and the mathematical basis of such diffusers will be set out below. Many of the advantages of the invention can however be obtained by keeping the average equivalent cone angle throughout the length of the diffuser at a predetermined value less than 12° divergent. With an average value maintained the side walls of the diffuser will be frusto-conical surfaces. In practice it may be preferred for ease of manufacture to employ frusto-conical surface diffuser walls. A compromise may be obtained with an average equivalent cone angle being maintained at a predetermined figure over the finite length of the diffuser with a slightly different cone angle through a succeeding finite length. Also where curved diffuser wall surfaces are employed they may be designed with different equivalent cone angles at different stations in the length of the diffuser, as may be desired.

Figures 12 and 13 have been included to explain more fully the concept of "equivalent cone angle." As shown in Figure 12, the cross-sectional width at the entrance to the diffuser passage 15 is designated by S. This entrance to the diffuser passage is located at a radial distance of $$\frac{D}{2}$$

($D$ being the diameter with respect to the central axis of the rotary impeller). The cross-sectional width at the exit of the diffuser passage is indicated by $s$; the exit of this diffuser passage is located at a radial distance of $$\frac{d}{2}$$

from the central axis of the rotary impeller. The total area at the inlet to the diffuser passage is then equal to $$2\pi \times \frac{D}{2} \times S$$

or $\pi DS$. Similarly, the area at the exit to the diffuser passage is equal to $$2\pi \times \frac{d}{2} \times s$$

or $\pi ds$. In either case, these areas are equal to the instantaneous peripheral area of the gas as it is passing into or out of the diffuser passage. In Figure 13, there are shown two circles, designated as "Area A" and "Area $a$," which represent the relative areas at the inlet and outlet ends, respectively, of the diffuser passage. The horizontal diameters of these circles are separated by a distance equal to $$\frac{d}{2} - \frac{D}{2}$$

Area $A$ is proportional to $SD$; area $a$ is proportional to $sd$. Two lines indicated as $x$ and $y$ are drawn through the extremities of the horizontal diameters and are extended downwardly to their point of intersection. The angle at which these lines $x$ and $y$ intersect is designated as $\theta$ which is the equivalent cone angle.

The basis for the design of a diffuser having a substantially constant cone angle throughout will now be described with reference to Figures 10 and 11. In Figure 10 there is shown a diffuser according to the invention the radius at the entry thereto being $R_0$ and its width being $W_0$. The small radial element of the diffuser is considered (it is exaggerated in the figure) at a radius $R$, its width there being $W$. At a radius $R+dR$ the width is $W+dW$. The element of the diffuser so cut off is in the form of an annulus with curved side surfaces. The cross sectional area of the diffuser at right angles to the radius at radius $R$ is then $$= A_1 = 2\pi R.W$$

The cross sectional area of the diffuser at right angles to the radius at radius $R+dR$ is then $$= A_2 = 2\pi(R+dR)(W+dW)$$

Let the equivalent cone angle over the element of length $dR=\theta$

Equivalent radius of cone at the entry to the element $$= (A_1/\pi)^{1/2} = (2RW)^{1/2} = r_1$$

Equivalent radius of cone at the outlet from the element $$= (A_2/\pi)^{1/2} = [2(R+dR)(W+dW)]^{1/2} = r_2$$

Bearing in mind the definition of equivalent cone angle it will be clear from Figure 11, wherein there are set up two parallel and coaxial diameters of length $2r_1$ and $2r_2$ a distance $dR$ apart, that the cone angle over the element which has entry and exit areas as set out above is $\theta$.

$$\tan \theta/2 = (r_2-r_1)/dR$$
$$= \frac{[2(R+dR)(W+dW)]^{1/2} - (2RW)^{1/2}}{dR}$$

As the equivalent cone angle is to be maintained constant, call $\tan \theta/2$, $K$.

Then $$KdR + (2RW)^{1/2} = [2(R+dR)(W+dW)]^{1/2}$$

I. e.

$$[KdR + (2RW)^{1/2}]^2 = 2(R+dR)(W+dW)$$

I. e.

$$K^2 dR^2 + 2RW + 2KdR(2RW)^{1/2} = 2RW + 2R.dW + 2W.dR + 2dR.dW$$

The second order terms may be neglected.

Then $$KdR(2RW)^{1/2} = R.dW + W.dR \qquad \text{I}$$

Let
$$RW = x$$
Differentiating
$$R.dW + W.dR = dx$$
Substituting this in Equation I
$$K.dR(2x)^{1/2} = dx$$
or
$$dR = [1/k.(2x)^{1/2}]dx$$
Integrating:
$$R = 1/K \int 1/(2x)^{1/2}.dx$$
$$= (1/K)(2x)^{1/2} + C$$
$$= (1/K)(2RW)^{1/2} + C \quad \text{II}$$
When $R = R_0$; $W = W_0$
Hence
$$C = R_0 - 1/K(2R_0W_0)^{1/2}$$
Substituting back into Equation II
$$R = (1/K)(2RW)^{1/2} + R_0 - 1/K(2R_0W_0)^{1/2}$$
Squaring and substituting for K we obtain
$$W = (1/2R)\tan^2\theta/2[R - R_0 + (1/K)(2R_0W_0)^{1/2}]^2$$

Considering an example with the following data given: $R_0 = 5$ inches, $W_0 = 0.6$ inch, required constant equivalent cone angle 12° divergent then, at any radius R $$W = (1/2R) \times (0.1051)^2[R - 5 + (1/0.1051)(2 \times 5 \times 0.6)^{1/2}]^2$$
$$= (0.00553/R)(R + 18.3)^2$$

From this equation the form of the curved wall diffuser can be quickly set out. As R increases from 5.0 to 10.0 inches, W decreases from 0.6 inch to 0.443 inch.

A straight sided diffuser comparable with the constant equivalent cone angle diffuser set out above has an equivalent radius of the cone at entry (i. e. at 5″ radius) of 2.45″. The equivalent radius of the cone at the exit (i. e. 10″ radius) is 2.97″. This cone gives an average equivalent cone angle of 11° 52′.

It should not be through that embodiments of the invention are limited to diffusers extending radially from an impeller tip. For example, a centrifugal compressor having a hyperboloidal rotor surface has been described in our British patent application No. 1952/50 (Case 441). In that instance, the median of the fluid passage following the impeller is at an angle between the radial and axial directions. A diffuser according to this invention may be conveniently associated with such a hyperboloidal impeller, with the same advantages as have been stated above.

What we claim is:

1. A vaneless walled diffuser at the exit from an elastic-fluid flow centrifugal compressor in which the diffuser walls define a passage having an equivalent cone angle over any small element of the whole length of the passage divergent to no greater extent than 12° in the median direction of flow, said equivalent cone angle being considered, over said small element of length, as the angle subtended by straight lines joining the extremities of parallel diameters of two coaxial circles, of areas respectively equal to the entry and exit cross-sectional areas of the element of the passage and separated by a distance equal to the length of said element, whereby the whirl velocity of the fluid at entry to the diffuser is substantially reduced during flow through the diffuser whilst the median velocity undergoes no alteration of comparable order.

2. A diffuser as claimed in claim 1 and in which said walls follow a smooth curve from entry to exit of the diffuser.

3. A diffuser as claimed in claim 2 and in which the equivalent cone angle is maintained substantially constant throughout the length of the diffuser.

4. A vaneless walled diffuser at the exit from an elastic fluid centrifugal compressor in which the diffuser walls define an average equivalent cone angle divergent to no greater extent than 12° measured in the median direction over the whole length of the diffuser, said equivalent cone angle being considered as the angle subtended by straight lines joining the extremities of parallel diameters of two coaxial circles, of areas respectively equal to the entry and exit cross-sectional areas of said diffuser and separated by a distance equal to the whole length of said diffuser.

References Cited in the file of this patent

UNITED STATES PATENTS

| 885,108 | Trent | Apr. 21, 1908 |
| 1,056,689 | Kieser | Mar. 18, 1913 |
| 1,171,926 | Carpenter | Feb. 15, 1916 |
| 1,617,133 | Moss et al. | Feb. 8, 1927 |
| 1,691,319 | Watkins | Nov. 13, 1928 |
| 2,370,202 | Stewart | Feb. 27, 1945 |

FOREIGN PATENTS

| 24,403 | Great Britain | of 1907 |
| 724,553 | Germany | Aug. 29, 1942 |